(12) United States Patent
Yoshimatsu et al.

(10) Patent No.: US 6,666,022 B1
(45) Date of Patent: Dec. 23, 2003

(54) DRIVE DEVICE OF WORKING MACHINE

(75) Inventors: Hideaki Yoshimatsu, Akashi (JP);
Masami Hideura, Kobe (JP); Etsujiro Imanishi, Kobe (JP)

(73) Assignee: Kobelco Construction Machinery Co., Ltd., Hiroshima (JP)

( * ) Notice: Subject to any disclaimer, the term of this patent is extended or adjusted under 35 U.S.C. 154(b) by 116 days.

(21) Appl. No.: 09/926,835

(22) PCT Filed: Jun. 21, 2000

(86) PCT No.: PCT/JP00/04074
§ 371 (c)(1),
(2), (4) Date: Dec. 28, 2001

(87) PCT Pub. No.: WO01/00935
PCT Pub. Date: Jan. 4, 2001

(30) Foreign Application Priority Data

Jun. 28, 1999 (JP) .......................................... 11/181173
Jun. 30, 1999 (JP) .......................................... 11/185903

(51) Int. Cl.[7] ............................................... F16D 31/02
(52) U.S. Cl. .......................................... 60/413; 60/414
(58) Field of Search ........................... 60/413, 414, 417

(56) References Cited

FOREIGN PATENT DOCUMENTS

| DE | 35 01 608 | 7/1986 |
| DE | 35 36 247 | 4/1987 |
| DE | 38 42 632 | 6/1990 |
| JP | 8-290891 | 11/1996 |
| JP | 10-103112 | 4/1998 |
| JP | 10-141110 | 5/1998 |
| JP | 10-252521 | 9/1998 |
| JP | 11-98607 | 4/1999 |

OTHER PUBLICATIONS

Patent Abstracts of Japan, JP 10–103112, Apr. 21, 1998.
Patent Abstracts of Japan, JP 8–290891, Nov. 5, 1996.

*Primary Examiner*—Edward K. Look
*Assistant Examiner*—Michael Leslie
(74) *Attorney, Agent, or Firm*—Oblon, Spivak, McClelland, Maier & Neustadt, P.C.

(57) ABSTRACT

A drive apparatus comprises an engine, a hydraulic pump, an electric motor concurrently serving as a generator, a battery, a first control device that charges the battery with the electric power generated by the electric motor concurrently serving as a generator and drives the electric motor concurrently serving as a generator using the electric power of the battery, and a controller. When the input of the hydraulic pump is smaller than the output of the engine, the engine is operated the set number of revolutions and the number of high idle revolutions. And, when the input of the hydraulic pump is larger than the output of the engine, the input of the hydraulic pump is reduced and the electric motor is operated in the electric motor action, whereby the engine output can be supplemented and the engine can be operated in the set number of revolutions.

9 Claims, 13 Drawing Sheets

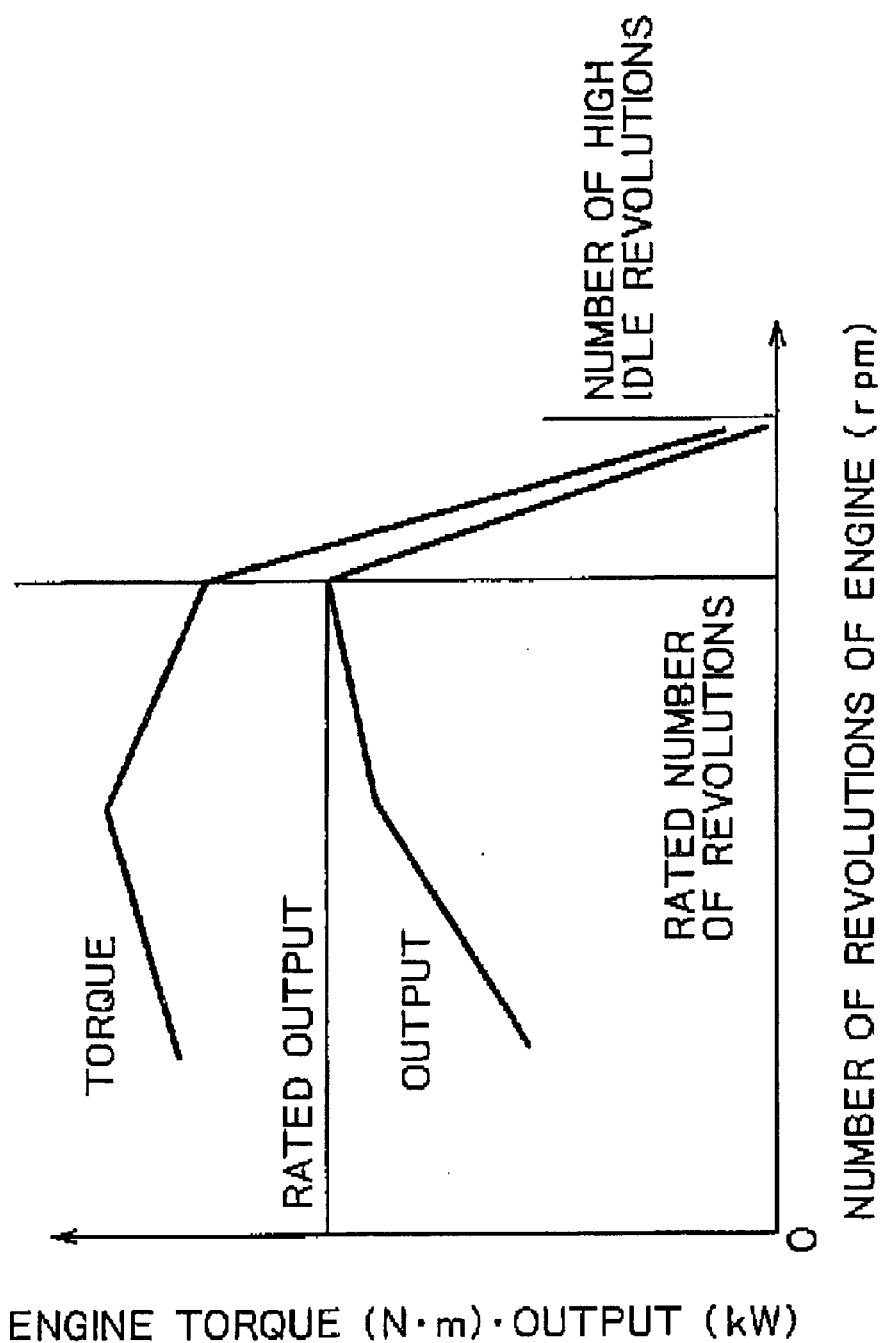

DRIVE DEVICE OF WORKING MACHINE

TECHNICAL FIELD OF THE INVENTION

The present invention relates to a drive apparatus of working machine such as an excavator, a crane and the like that uses an engine such as a diesel engine and the like as a power source, and in particular to a drive apparatus of working machine, in which an electric motor concurrently serving as a generator and a battery, which are connected to one end of an output of engine, supplement the output of the engine.

BACKGROUND OF THE INVENTION

Conventionally, a working machine such as an excavator, a crane and the like is generally provided with an engine such as a diesel engine and the like in order to obtain a power for self-traveling, by which a hydraulic pump is driven, and the rotation of crawlers or tires for traveling and the movement of each working part such as a boom, an arm, a bucket and the like are performed by supplying hydraulic oil discharged from the hydraulic pump to a hydraulic actuator such as a hydraulic pump, a hydraulic cylinder and the like.

FIG. 13 is a view showing a general construction of a self-traveled excavator, FIG. 14 is a graph showing a relationship between discharge flow rate and discharge pressure of a hydraulic pump, and FIG. 15 a graph showing a relationship between the number of revolutions and output torque of an engine.

In FIG. 18, the self-traveled excavator comprises traveling crawlers 102 having left and right travel-driving hydraulic motors 101, and an upper rotating body 103 is provided on the traveling crawlers 102 to be rotatable about a vertical axis. The upper rotating body 103 is provided with an engine 105, a hydraulic pump 106, a hydraulic oil tank 107, a fuel tank 108, a rotation-driving hydraulic motor 109, a rotation-driving decelerator 110 and the like as well as a cab 104. In the front part of the upper rotating body 103, a boom 111, an arm 112, and a bucket 113 are provided as working members for performing the working, which are connected to be actuated by a boom cylinder 114, an arm cylinder 115, and a bucket cylinder 116, respectively. The hydraulic pump 106 is rotated by using the output of the engine 105 as a power source and the travel-driving hydraulic motor 101, the rotation driving hydraulic motor 109, the boom cylinder 114, the arm cylinder 115, and the bucket cylinder 116, which actuate respective working members, are driven by using hydraulic oil discharged from the hydraulic pump 106.

For the hydraulic pump 106, e.g. a variable discharge pump may be used, and its output is controlled to have a constant power (discharge pressure x discharge flow rate) characteristic in relation to discharge pressure and discharge flow rate, thereby to be set to a value near a rated output of engine so that its output shall not exceed the nominal power of engine. By this, it is envisaged that the power of engine can be utilized at its most while preventing the absorbed horse power of the hydraulic pump from exceeding the nominal power of engine to cause an engine stall (ENST).

As shown in FIG. 14, the constant power characteristic of a variable discharge pump is indicated as a hyperbola on the plane of discharge pressure-discharge flow rate, and the input of pump (B) is set to a value near the rated output (A) of the engine, so that the rated output of the engine can be utilized as much as possible.

In addition, as shown in FIG. 15, the engine 105 has a torque rising characteristic in the range below the rated number of revolutions, while it has a characteristic that both of its output and torque are reduced, in the range from the rated number of revolutions to the number of high idle revolutions.

In order to efficiently use the power of engine, the engine 105 reaches to the maximum (rated) number of revolutions when the input of hydraulic pump 106 is at the maximum, and is operated near the rated number of revolutions. Therefore, if the input of hydraulic pump becomes smaller, the number of revolutions of engine shifts toward the number of high idle revolutions and is operated in the number of revolutions higher than the rated number of revolutions. The number of high idle revolutions is higher than the rated number of revolutions up to about 10%.

Further, in a transition state where the input of hydraulic pump 106 is temporarily increased larger than the output of the engine 105, the number of revolutions of engine is decreased lower than the rated number of revolutions due to a delay in control of the variable discharge pump and the like, whereas the output torque of the engine is increased and the engine stall is prohibited due to the torque rising characteristic of engine. In this way, engine is operated between the rated number of revolutions and the number of high idle revolutions in the normal state except the transition state.

Like this, the reason why the power by hydraulic pressure is used as a drive apparatus is that it has some merits as compared to electric power in that (1) because driving machinery and tools are light and compact, they are suitable to be mounted in a working machine to meet its self-traveling movement, and (2) it is easy to obtain a large reciprocating thrust if a hydraulic cylinder is used. However, power by hydraulic pressure has a problem in that energy efficiency for working is poor as compared to electric power. In a hydraulic circuit, by performing the control of directions, pressure and flow rate for hydraulic fluid discharged from the hydraulic pump using a control valve, actuating direction, actuating force and actuating velocity of a hydraulic actuator are controlled. In this case, if the proportion of hydraulic energy bled and wasted by the control valve for performing the control of pressure and flow rate of hydraulic oil is large, and when the energy supplied from the power source is used for working, the loss of energy is large.

Furthermore, the energy needed by a working machine to perform a work is varied with the lapse of time in accordance with the content of work to be formed; there were problems in that an engine which is a power source should have a capacity that can provide a maximum input energy required by a hydraulic pump, and the utilization efficiency of engine power is low.

Therefore in recent years, in order to overcome the lowering of utilization efficiency of the engine power and the deterioration of utilization efficiency of hydraulic power, the following techniques have been proposed, from the view of saving energy.

Firstly, an internal combustion engine for a hydraulic excavator has been proposed, wherein an inductor is provided in a power line of engine and the combustion engine comprises a battery for accumulating electric energy regenerated by the inductor, an inverter circuit for converting electric energy accumulated in the battery into AC electric power and supplying it to said inductor as well as for converting AC electric power regenerated by the inductor into DC electric power and supplying it to said battery, and a switching means for switching and controlling the actions of said inverter circuit (Japanese Utility Model Unexamined Publication No. Hei 5-48501:first prior art).

This is to operate the inductor as a regenerative generator to charge the battery with electricity via the inverter circuit when the work performed by the working machine is a low load one in which the engine power has a margin, and to operate the inductor as an electric motor using the electric power accumulated in the battery via the inverter circuit to assist the engine when the work performed by the working machine is a high load work in which a power larger than the engine power is required.

By this, it becomes possible to cope with all kinds of works using an engine, the capacity of which is smaller than a maximum working energy required by the hydraulic pump (rated power of engine in FIG. 14(C)), whereby it is envisaged that the engine can be miniaturized to efficiently utilize the power of engine.

Next, it has been also proposed to provide a rotating hydraulic pump motor that performs rotation driving of a rotation system, an accumulator for driving said rotating hydraulic pump motor and a rotation controller for switching and controlling the action of said rotating hydraulic pump motor, wherein said rotating hydraulic pump motor is operated in a pump action to regenerate rotational energy at the time of braking the rotation system, and additionally an electric motor concurrently serving as a generator is installed in the rotation pump motor, so that the power generating action and assisting action of said electric motor will be switched by controlling the switching of a rotation controller (Japanese Patent Unexamined Publication Hei 10-103112:second prior art).

According to this, it is envisaged that energy can be saved by accumulating rotational energy at the time of braking the rotation system and reusing it at the time of rotation, and the deterioration of energy efficiency in the hydraulic circuit can be improved.

There were problems in the prior art using the engine installed with the inductor, which is the first prior art, in that because the inductor is switched between the power generating action and driving action in accordance with variation of work load, the work load may be larger than the engine output so that when the inductor is switched to the driving action, the number of revolutions of engine may be largely reduced, for example, from 2000 rpm to 1400 rpm, which appears as the variation of velocity in driving the hydraulic circuit, whereby the utilization convenience thereof in manipulating the working machine will be deteriorated.

And, in the case of the drive apparatus used in rotation driving the rotating hydraulic pump motor, which is the second prior art, there was also a problem in that regenerated hydraulic energy can be used only in rotation driving the rotation system.

Furthermore, according to the prior art as explained in the above, because the actuator, which is a driving part, is driven by a hydraulic pump directly coupled to an engine and/or a pressure accumulating means, it is possible to realize smooth action following the movements of manipulation lever when moving the arm or the boom of the hydraulic excavator, whereas there was a problem that energy efficiency becomes deteriorated because the hydraulic pump directly coupled to the engine the like is used in driving an actuator, and according to said prior art, it was impossible to meet with both of the maneuverability of drive apparatus of working machine and relatively high energy efficiency.

SUMMARY OF THE INVENTION

In view of the problems of the prior art, the primary object of the present invention is to provide a drive apparatus of working machine, which is improved in utilization convenience while attaining the improvement in utilization efficiency of energy.

Also, the secondary object of the invention is to provide a drive apparatus of working machine having a relatively high efficiency of energy while attaining a good maneuverability of moving parts.

According to the first aspect of the present invention, the drive apparatus of working machine comprises: an engine; a hydraulic pump connected to said engine and having a maximum input larger than an output of said engine; an electric motor concurrently serving as a generator which is connected to the output shaft of said engine and performs a generator action or an electric motor action; a battery for accumulating electric power generated by said electric motor concurrently serving as a generator; a first control device connected to said electric motor and said battery to switch the actions of said electric motor, the first control device charging said battery with electric power generated by rotation of said electric motor at the time of the generator action, and supplying electric power accumulated in said battery to said electric motor to rotate it at the time of the electric motor action; and a controller connected to said first control device, wherein when an input of said hydraulic pump is smaller than said output of the engine, said controller operates said engine between the set number of revolutions and, the number of high idle revolutions of the engine and when the input of said hydraulic pump is larger than the output of said engine, said controller reduces the input of the said pump and operates said electric in the electric motor action using the electric power accumulated in said battery to supplement that the output of said engine will, so that said engine will be operated near the set number of revolutions.

According to this construction, because the number revolutions of the engine is stable and the engine is operated in the set number of revolutions even if the input of hydraulic pump is larger than the output of engine, it is not affected by the variation of velocity in the hydraulic circuit and the utilization convenience of working machine will not be deteriorated. In other words, the drive apparatus of this working machine comprises the first control device that charges the battery with electricity by the electric motor connected to the engine at the time of low load working and drives the electric motor concurrently serving as a generator using the electric power accumulated in the battery to assist the output of engine at the time of high load working, and the controller that controls the number of revolutions of the engine to be turned to the set number of revolutions when the electric motor concurrently serving as a generator is operated in the generator action, whereby it is possible to use an engine, the output of which has a capacity smaller than the maximum input of hydraulic pump, and the utilization convenience of the working machine will not be deteriorated because the number of the engine is stably maintained.

Also, according to the second aspect of the present invention, the drive apparatus of working machine comprises: an engine; a hydraulic pump connected to said engine and having a maximum input larger than the output of said engine; an electric motor concurrently serving as a generator which is connected to an output shaft of said engine and performs a generator action or an electric motor action; a battery for accumulating electric power generated by said electric motor concurrently serving as a generator; a second control device connected to said electric motor and said battery to switch the actions of said electric motor the second control device charging said battery with electric power generated by rotation of said electric motor at the time of the generator action, and supplying electric power accumulated in said battery to said electric to rotate it, at the time of electric motor action; a generator concurrently serving as a rotating electric motor that rotates a rotating body of the working machine and performs an electric motor action or a generator action; and a third control device connected to said generator currently serving as a rotating electric motor and said battery to switch the actions of said generator concurrently serving as a rotating electric motor, the third control device operating said generator concurrently serving as a rotating electric motor in the electric motor action to drive said generator concurrently serving as a rotating electric motor using the electric power accumulated in said battery, at the time of rotating the rotating body, and operating said generator concurrently serving as a rotating electric motor in the generator action to charge said battery with the electric power generated by said generator concurrently serving as a rotating electric motor, at the time of braking the rotating body.

According to this construction, because the battery can be charged with electricity by operating the generator concurrently serving as a rotating electric motor in the generator action to perform regenerative braking the revolution, it is envisaged that energy can be reused without bring a rise in temperature of hydraulic oil and can also be reused other than rotation driving. In other words, the drive apparatus of this working machine comprises: the second control device that charges the battery with electricity by the electric motor concurrently serving as a generator connected to the engine, at the time of low load working, and drives the electric motor concurrently serving as a generator using the electric power accumulated in the battery to assist the output of engine at the time of high load working; the generator concurrently serving as a rotating electric motor for rotating the rotating body; and the third control device that charges the battery with electricity by said generator concurrently serving as a rotating electric motor, at the time of braking rotation and drives the generator concurrently serving as an electric motor using the electric power accumulated in the battery, at the time of rotation, whereby energy can also be reused for driving other than the rotating system and energy can be saved.

Furthermore, according to the third aspect of the present invention, the drive apparatus of working machine of the second aspect of the present invention as explained in the above, further comprises a controller connected to said second control device and said third control device, wherein when an input of said hydraulic pump is smaller than the output of said engine, said controller operates said engine between the set number of revolutions and the number of high idle revolutions, and when the input of said hydraulic pump is larger than the output of said engine, the controller reduces the input of said hydraulic pump and operates said electric motor concurrently serving as a generator in the electric motor action using the electric power accumulated in said battery to supplement the output of said engine, thereby operating said engine near the set number of revolutions.

According to this construction, because the number of revolutions of the engine is stable and operated in the set number of revolutions when the input of the hydraulic pump is larger than the output of the engine, the utilization convenience will not be deteriorated without being affected by the variation of velocity in the hydraulic circuit, and because the battery can be charged with electricity by operating the generator concurrently serving as a rotating electric motor in the generator action to perform regenerative breaking, at the time of breaking of the rotation body, the energy can be reused besides rotation driving.

Also, according to the fourth aspect of the present invention, in the drive apparatus of working machine according to any of the first to third aspects of the present invention, said engine and said electric motor serving as a generator are connected via an accelerating apparatus.

According to this construction, because the electric motor can be operated in a higher number of revolutions, it is possible to make the electric motor concurrently serving as a generator in a compact form and the space for locating it can be reduced.

In addition, the drive apparatus according to the fifth aspect of the present invention comprises: an engine; a first hydraulic pump driven by said engine; a first hydraulic actuator connected to said first hydraulic pump via a control valve; an electricity storage means for accumulating electric energy, an energy conversion means which can selectively perform a function that converts mechanical energy received from said engine into electric energy to supply to said electricity storage means and a function that converts electric energy received from said electricity storage means into mechanical energy to supply to said first hydraulic pump; and a first electric motor that receives a supply of electric energy from at least one of said energy conversion means and said electricity storage means and serves as a driving source of moving parts.

According to this construction, because the first hydraulic pump driven by the engine is connected to the first hydraulic actuator via the control valve, it is possible to attain a good maneuverability for moving parts, for example, an arm, a boom, and the like of excavator, which need to be smoothly moved following the movements of a manipulation lever.

Also, because the first electric motor that receives electric energy from at least one of the energy conversion means and the electricity storage means serves as a driving source for moving parts, it is possible to increase the energy efficiency, as compared to the prior art by using the first electric motor as the driving source of moving parts which do not require high maneuverability, for example a bucket of hydraulic excavator, a rotating system, a traveling system and the like.

That is, in the drive apparatus of working machine of this construction, the moving parts, which require good maneuverability are driven by the first hydraulic pump and the first electric motor is made to be serve as a driving source for the moving parts which do not require good maneuverability, whereby it is possible to realize relatively high efficiency of energy while attaining good maneuverability of the moving parts.

Also, because the moving parts are separated into two groups, the one operated by the first hydraulic pump and the other operated by the first electric motor, they can be made in a relatively small size, respectively, and separately mounted in different places. For example, the first hydraulic pump may be located within the main shell of the first hydraulic pump and the first electric motor may be located adjacent corresponding moving parts, whereby it is possible to provide a compact drive apparatus without requiring to provide a large space in one place.

Furthermore, because the energy conversion means can selectively perform the function that converts mechanical energy received from the engine into electric energy and supplies it to the electricity storage means, and the function that converts electric energy received from the electricity storage means into mechanical energy and supplies it to the first hydraulic pump, a surplus torque of engine can be used to perform generation of electric power for a accumulating electric energy in the electricity storage means, at the time when the first hydraulic pump side is low loaded, and the electric energy accumulated in the electricity storage means can be used as a driving source and the energy conversion means can be used as a motor to supplement the torque of the first hydraulic pump, at the time when the first hydraulic pump side is high loaded, whereby it is possible to equalize and reduce the burden of engine. For this reason, the engine may have a dimension that can take a share of average output and need not to be made so large to cope with the maximum output, whereby it is possible to reduce the engine size, to decrease exhaust gas and noise, and to save energy.

Still, according to the sixth aspect of the present invention, in the drive apparatus of working machine of the fifth aspect, the electric energy generated by regenerative control of said first electric motor is accumulated in said electricity storage means.

According to this construction, because the electric energy generated by regenerative control of said first electric motor is accumulated in the electricity storage means, it is possible to increase the energy efficiency much higher.

Yet, according to the seventh aspect of the present invention, the drive apparatus of working machine of the fifth aspect further comprises a second hydraulic pump driven by said first electric motor, and a second hydraulic actuator driven by said second hydraulic pump.

According to this construction, because the second hydraulic pump driven by said first electric motor drives the second hydraulic actuator, a large thrust can be supplied when it is required to perform a linear movement of a moving part, and the construction is simple as compared to the case that a rack and pinion mechanism and the like convert linear movements into rotating movements.

Still yet, according to the eighth aspect of the present invention, in the drive apparatus of working apparatus of the seventh aspect, said first electric motor, said second hydraulic pump and said second hydraulic actuator are integrated as one unit.

According to this construction, because the first electric motor, the second hydraulic pump and the second actuator are integrated, they can be miniaturized and low-weighted, and when the second hydraulic actuator is not required to be operated, it is possible not to waste surplus hydraulic oil by stopping the corresponding first electric motor and second hydraulic pump. Accordingly, the energy efficiency can be more increased. In addition, because it is not required to provide a piping for coupling the second hydraulic pump and the second actuator, the construction can be simplified and the likelihood of leakage can be decreased.

Furthermore, according to the ninth aspect of the present invention, the drive apparatus of working machine of the fifth aspect further comprises a second electric motor that receives electric energy from at least one of said energy conversion means and said electricity storage means, and a third hydraulic pump driven by said second electric motor, pressure oil from said third hydraulic pump being supplied between said first hydraulic pump and said control valve.

According to this construction, because the pressure oil from said third hydraulic pump is supplied between said first hydraulic pump and said control valve and hence the pressure of the oil in this portion can be fixedly maintained, the operation starting position of the manipulation lever will not be changed by the load applied to the first hydraulic actuator and the first actuator always starts to move from a fixed position of the manipulation lever, thereby improving the maneuverability. In addition, it becomes possible to fixedly maintain the operation starting position of the manipulation lever even by merely compensating the variation of load applied to the first hydraulic actuator with torque assist by the energy conversion means.

BRIEF DESCRIPTION OF THE DRAWINGS

FIG. 15 is a graph showing the relationship between the output number of revolutions and torque of the engine.

PREFERRED EMBODIMENT OF THE INVENTION

Herein below, preferred embodiments of the present invention will be described with reference to the drawings. In the below embodiments, examples for applying the present invention to a self-traveled excavator provided with a working member such as a boom, an arm and bucket will be illustrated. However, the present invention can be broadly applied to a drive apparatus of working machine comprising a working member using an engine as a driving source.
First Embodiment (FIG. 1 to FIG. 3)

Figure 1:
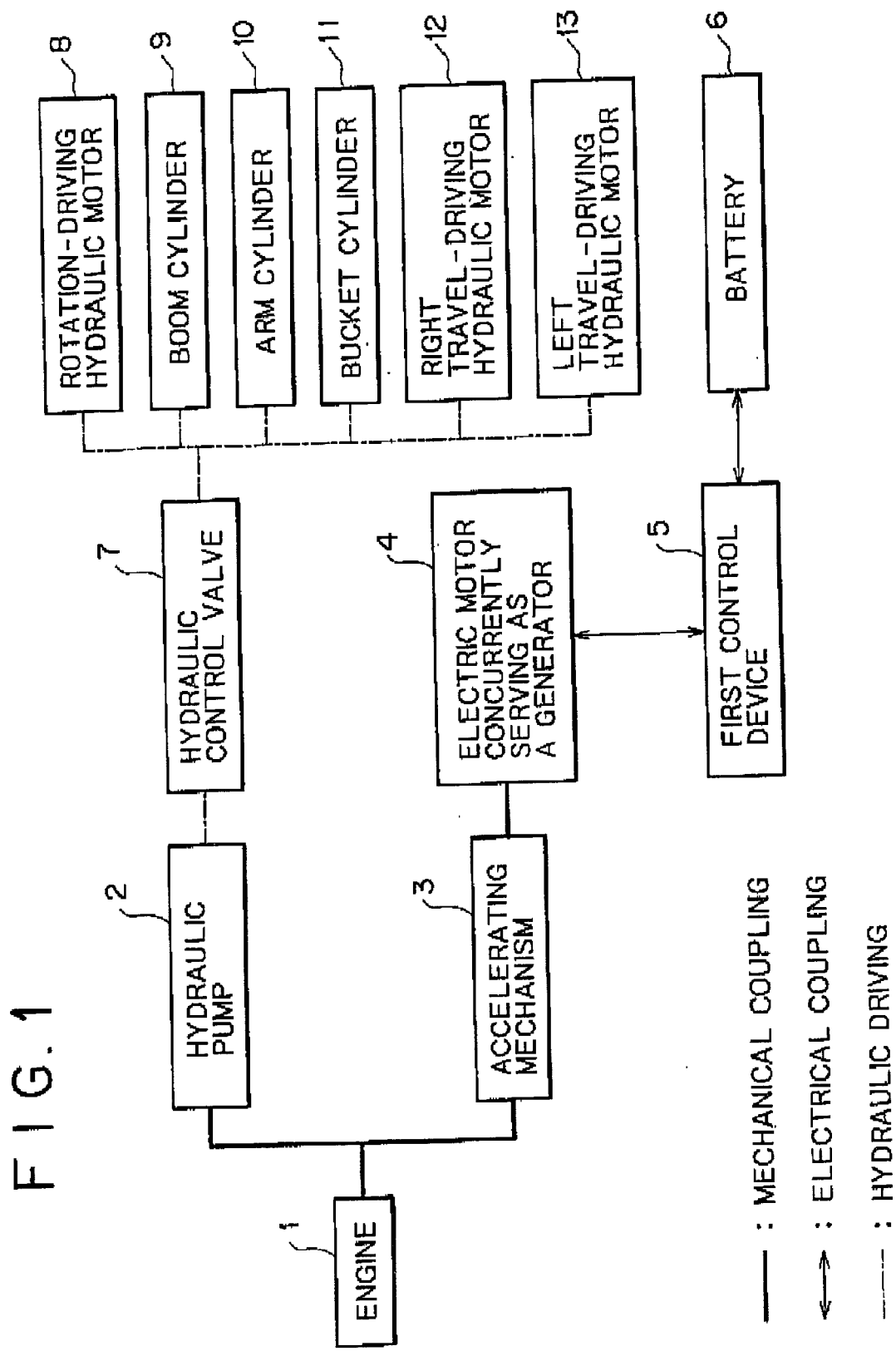
FIG. 1 is a systematic view of power transmission related to the first embodiment of the present invention.
Figure 2:
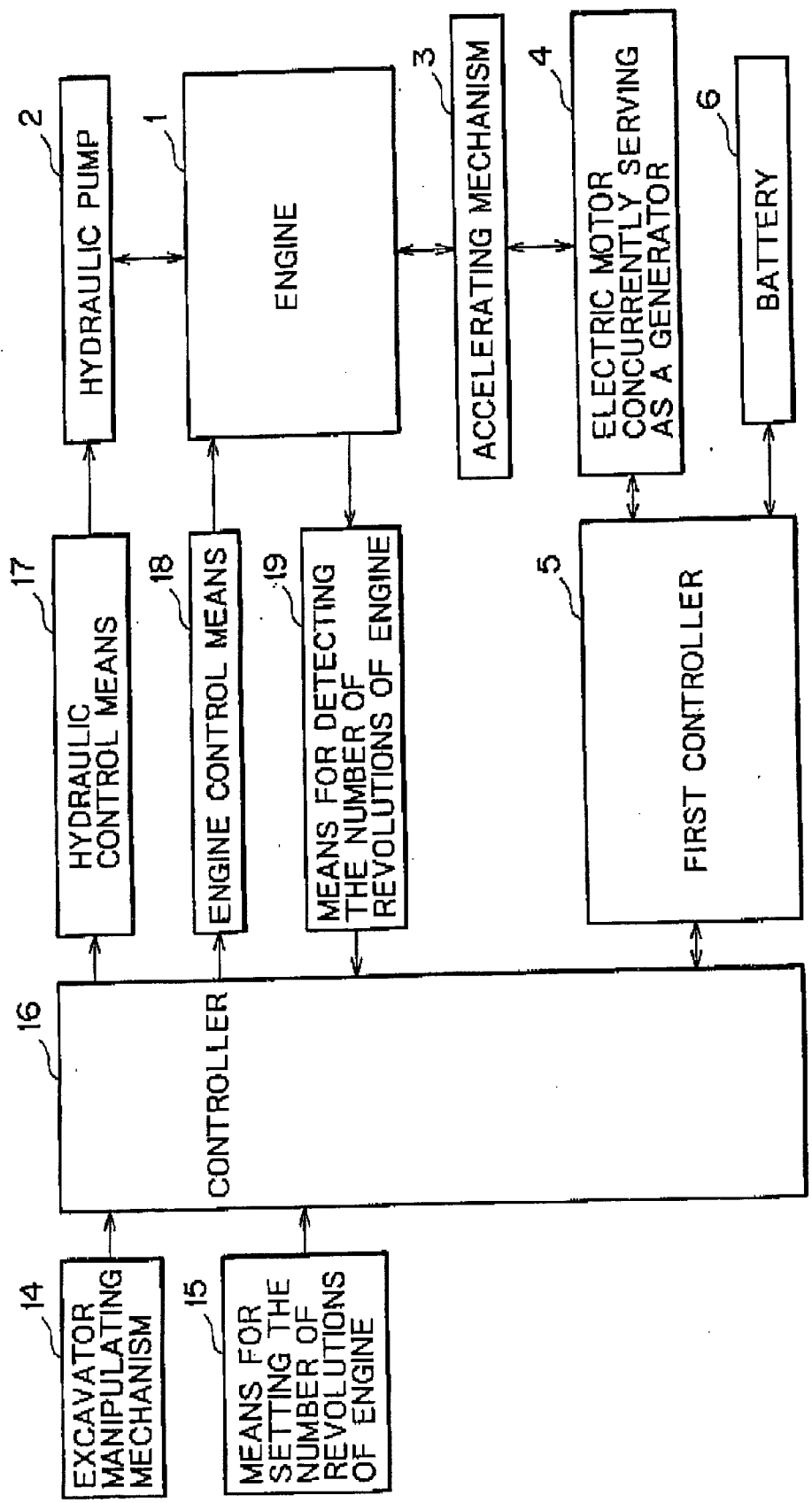
FIG. 2 is a block diagram related to the first embodiment of the present invention.
Figure 3:
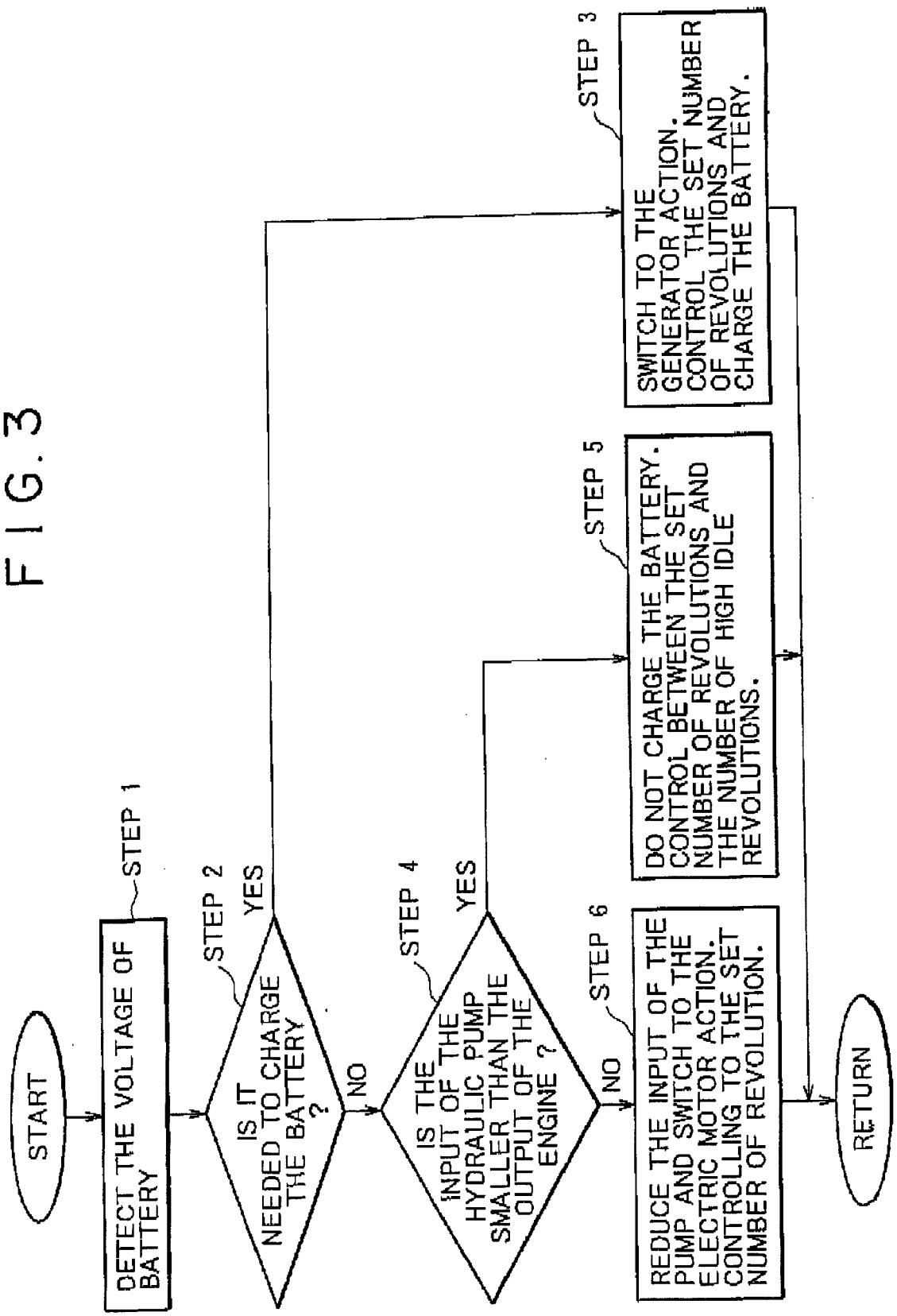
FIG. 3 is a flow chart related to the first embodiment of the present invention.

FIG. 1 is a systematic view of power transmission showing the first embodiment, FIG. 2 is a block diagram showing the first embodiment, and FIG. 3 is a flow chart related to the first embodiment.

In the systematic view of power transmission to FIG. 1, a hydraulic pump 2 is connected to an engine 1 which is a driving source, and a rotation-driving hydraulic motor 8, a boom cylinder 9, an arm cylinder 10, a bucket cylinder 11, a right travel-driving hydraulic motor 12, and a left travel-driving hydraulic motor 13, which are hydraulic actuators, are driven by the hydraulic oil discharged from the hydraulic pump 2 via a hydraulic control valve 7.

The output of the engine 1 is also connected to an electric motor 4 via an accelerating mechanism 3. This accelerating mechanism 3 is, for example, a flat rate gear type accelerator, the input shaft of which is connected to the output shaft of the engine, and a gear mounted on the input shaft and a gear mounted on the output shaft accelerate the rotation of the input shaft three times and transfer it to the output shaft with their mated number of teeth. The electric motor 4 concurrently serving as a generator is also connected to a first control device 5 and the first control device 5 is connected to a battery 6.

The electric motor 4 is, for example, a three phase AC inductor that performs a generator action or an electric motor action, and is constructed to switch these actions by the first control device 5. When the electric motor 4 performs the generator action, AC electric power generated thereby is converted into DC electric power by the first control device 5 and charged to the battery 6 connected to the first control device 5. When the electric motor 4 performs the generator action, DC electric power accumulated in the battery 6 is converted into AC electric power by the first control device 5 and the electric motor 4 is rotatively driven by the AC electric power.

In this situation, the rotatory force of the electric motor 4 is transferred to the output shaft of the engine 1, after being decelerated in this case, via the accelerating mechanism 3 to assist the output of the engine 1.

Also in the case that the electric motor 4 is a DC motor, the above operations are similarly performed: the charging of electricity of the battery 6 is performed via the first control device 5 by the generation of electricity of the electric motor 4 and the rotative driving of the electric motor 4 are performed using the electric power accumulated in the battery 6 via the first control device 5.

In addition, when the electric motor 4 is a three phase AC inductor, the first control device 5 comprises a converter circuit that rectifies AC electric power generated by the inductor and charges the battery with electricity, and an inverter circuit that converts DC electric power accumulated in the battery into AC electric power and rotatively drives the inductor.

In the block diagram shown in FIG. 2, an excavator manipulating mechanism 14 for manipulating a working member of the excavator, and means 15 for setting the number of revolutions of engine, for example, a throttle lever and the like is connected to a controller 16. In addition, the controller 16 is connected to a hydraulic pump control means 17 for variably controlling the input of the hydraulic pump 2. The pump 2 is a variable discharge type hydraulic pump and has a constant output characteristic in relation to the discharge pressure and flow rate. Further, the controller 16 is connected to engine control means 18 for controlling the number of revolutions or output of the engine 1, for example, an all speed type electronic governor and the like. The output number of revolutions of the engine 1 is detected by the means 19 for detecting the number of revolutions of engine and notified to the controller 16 via the means 19 for detecting the number of revolutions of engine. In addition, the controller 6 is connected to the first control device 5 to control its action. This controller 16 consists of a microcomputer and the like and performs the start of engine, the control of each hydraulic actuator and the like, depending on the excavator manipulating mechanism 14. The first control device 5 is connected to the electric motor 4 and the battery 6, respectively. The first control device 5 detects the voltage of the battery 6 and notifies it to the controller 16.

The control actions of the controller 16 at the time of operating will be explained with reference to the flow chart of FIG. 3.

STEP 1: During the operation of a working machine, the battery voltage of the battery 6 is notified to the controller 16 via the first control device 5.

STEP 2: Judgment as to whether the charge of electricity of battery is required or not is performed.

STEP 3: If the charge of electricity of battery is required in STEP 2, the engine 1 is controlled via the engine control means 18 and turned to the set number of revolutions (for example, 2000 rpm) which is set by the means 15 for setting the number of revolutions of engine, the electric motor 4 is switched to the generator action via the first control device 5, and electric power generated by the electric motor 4 concurrently serving as a generator is charged to the battery 6.

STEP 4: If the charge of electricity of battery is not required in STEP 2, judgment as to whether the input of the hydraulic pump 2 is smaller than the output of the engine 1 or not is made.

STEP 5: If the input of the hydraulic pump 2 is smaller than the output of the engine 1 in STEP 4, the number of revolutions of the engine 1 is controlled and turned to between the set number of revolutions and the number of high idle revolutions via the engine control means 18, without performing the charge of electricity of battery via the first control device 5.

STEP 6: If the input of the hydraulic pump 2 is larger than the output of the engine 1 in STEP 4, the input of the hydraulic pump 2 is reduced via the hydraulic pump control means 17, the electric motor 4 concurrently is switched to the electric motor action via the first control device 5, so that the electric motor output of the electric motor concurrently serving as a generator supplement the torque of the engine 1 via the accelerating mechanism 3, and the number of revolutions of the engine 1 turns to the set number of revolutions via the engine control means 18.

With such a drive apparatus, it is possible to obtain functional effects as follows. An engine having a capacity smaller than the maximum output of the hydraulic pump 2 can be used, whereby efficient utilization of engine output can be attained and the energy will be saved. Moreover, even if the horsepower absorbed by the hydraulic pump 2 is increased over the output of the engine 1, it is possible to maintain the number of revolutions of the engine in the set number of revolutions of the engine because the number of revolutions of engine is stable without being reduced so high as in the prior art, whereby variation the number of revolutions of the engine will not affect the control of hydraulic actuator and utilization convenience of working machine will not be deteriorated.

Figure 4:
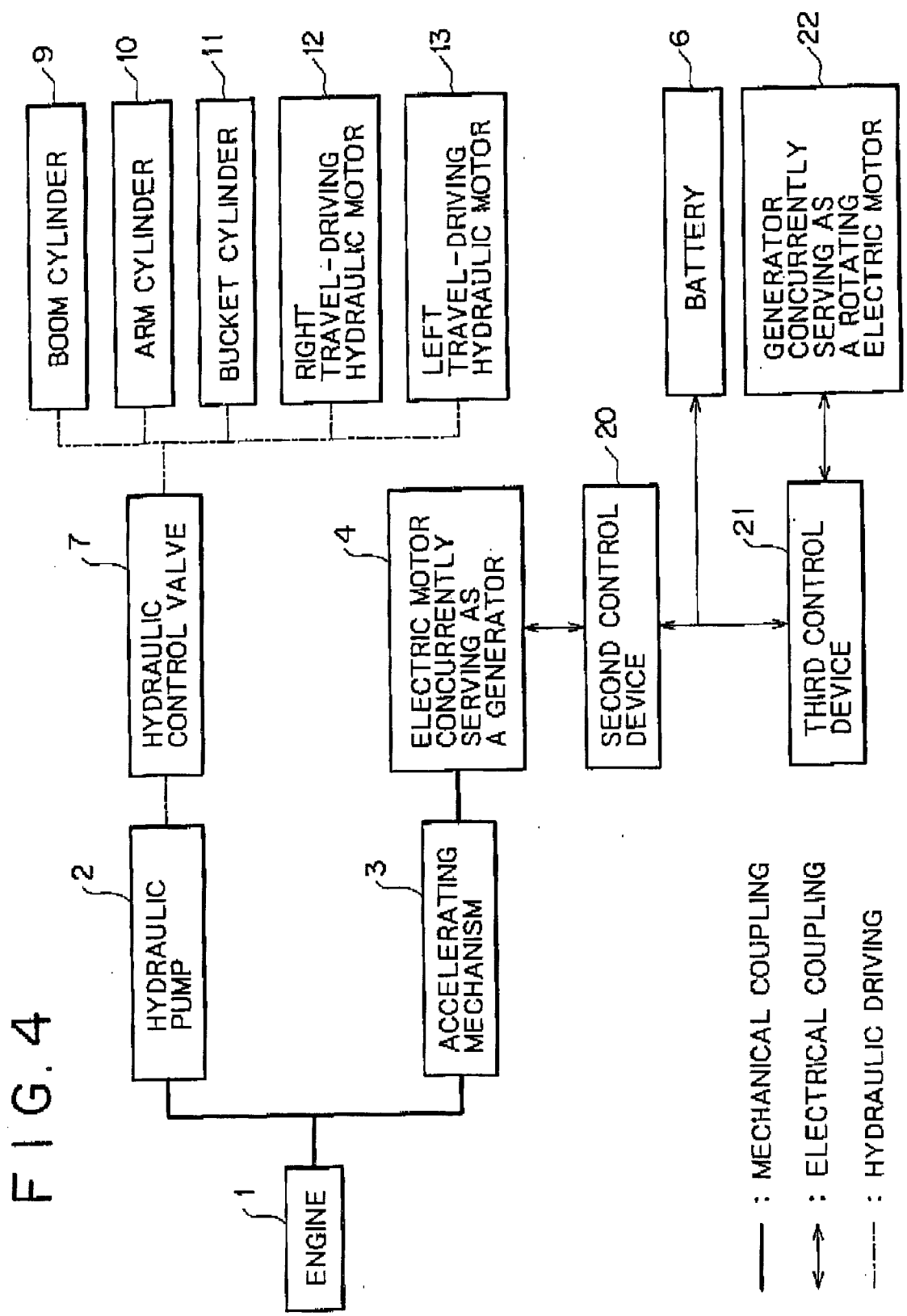
FIG. 4 is a systematic view of power transmission related to the second embodiment of the present invention.
Figure 5:
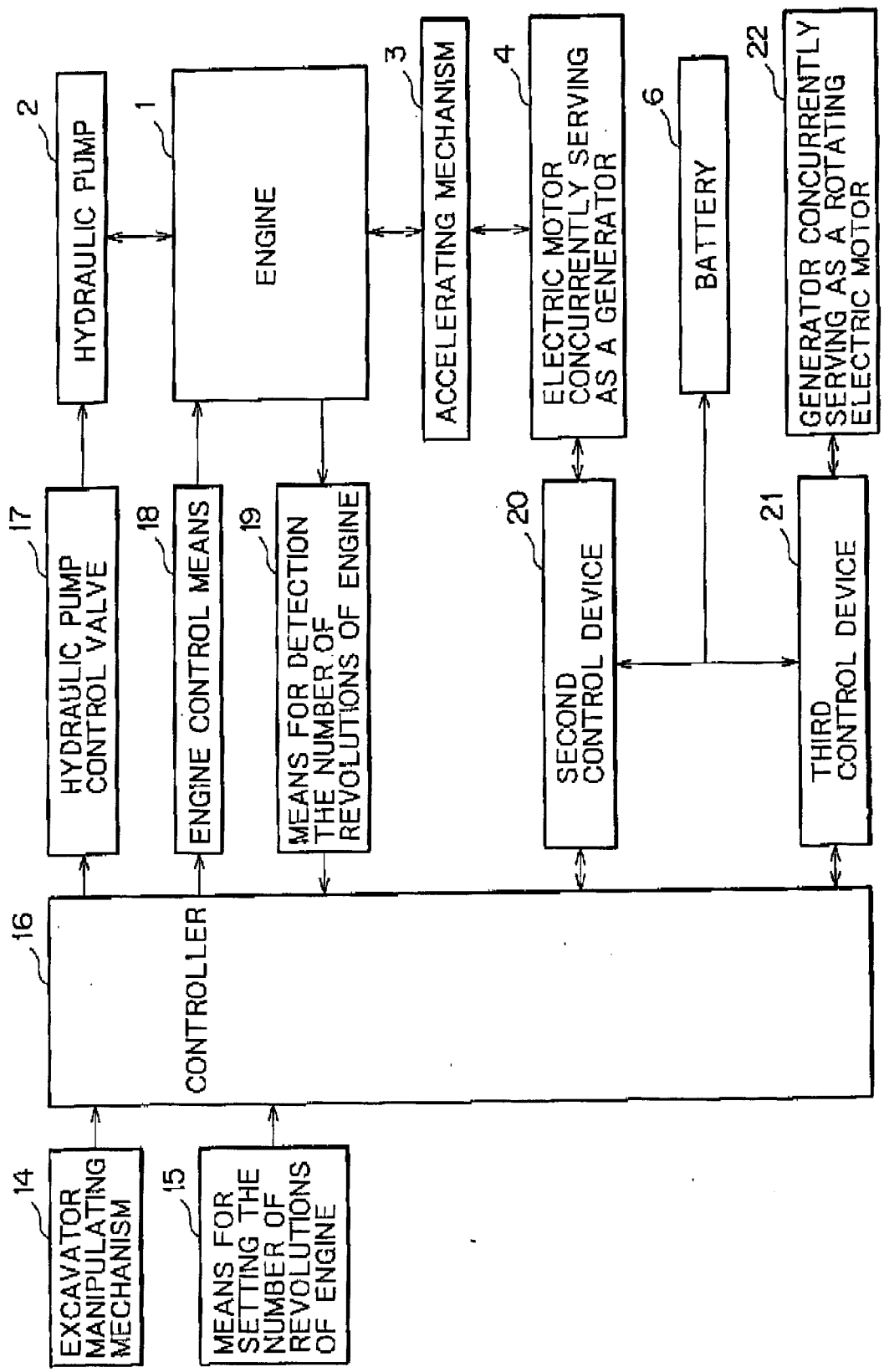
FIG. 5 is a block diagram related to the second embodiment of the present invention.

Second Embodiment (FIGS. 4 and 5)

FIG. 4 is a systematic view of power transmission showing the second embodiment of the present invention, in which a hydraulic pump 2 is connected to the output of an engine 1 as a power source, and a boom cylinder 9, an arm cylinder 10, a bucket cylinder 11, a right travel-driving hydraulic motor 12, and a left travel-driving hydraulic motor 13, which are hydraulic actuators, are driven by the hydraulic oil discharged from the hydraulic pump 2 via a hydraulic control valve 7. The output of the engine 1 is also connected to an electric motor 4 via an accelerating mechanism 3. The electric motor 4 is also connected to a second control device 20 and the second control device 20 is connected to a battery 6. In addition, a third control device 21 is connected to said battery 6 and the third control device 21 is also connected to a generator 22 concurrently serving as a rotating electric motor of a upper rotating body.

The electric motor 4 is, for example, a three phase AC inductor that performs a generator action or an electric motor action, and is constructed to switch these actions by the second control device 20. When the electric motor 4 performs the generator action, AC electric power generated thereby is converted into DC electric power by the second control device 20 and charged to the battery 6 connected to the second control device 20. When the electric motor 4 performs the electric motor action, DC electric power accumulated in the battery 6 is converted into AC electric power by the second control device 20 and the electric motor 4 is rotatively driven by the AC electric power. In this situation, the rotatory force of the electric motor 4 is transferred to the output shaft of the engine 1, after being decelerated in this case, via the accelerating mechanism 3 to assist the output of the engine 1.

In addition, the generator 22 concurrently serving as a rotating electric motor is, for example, a three phase AC inductor that performs a generator action or an electric motor action, and is constructed to switch these actions by the third control device 21. When the performs the electric motor action, DC electric power accumulated in the battery 6 is converted into AC electric power by the third control device 21 and the generator 22 is rotatively driven by the AC electric power. When the generator 22 performs the generator action, AC electric power generated thereby is converted into DC electric power by the third control device 21 and charged to the battery 6 connected to the third control device 21. Furthermore, if the generator 22 is a three phase AC inductor, the third control device 21 comprises a converter circuit that rectifies the AC electric power generated by the inductor and charges it to the battery, and an inverter circuit that converts the DC electric power accumulated in the battery into the AC electric power and rotatively drives the inductor. With such a drive apparatus, it is possible to obtain functional effects as follows. Because the battery 6 can be charged with electricity by operating the generator 22 in the generator action at the time of braking the rotating body to perform regenerative braking, it is possible to reuse energy besides in rotation driving as compared to the hydraulic regeneration of prior art. In addition, by constructing the rotation driving system to be independent from the hydraulic circuit, functional effects are obtained that there will be no interference when a working is performed by combined actions of the rotation driving system, whereby controllability can be enhanced.

FIG. 5 is a block diagram of the second embodiment. In the block diagram shown in FIG. 2, an excavator manipulating mechanism 14 for manipulating a working member of the excavator, and means 15 for setting the number of revolutions of engine, for example a throttle lever and the like are connected to a controller 16. In addition, the controller 16 is connected to a hydraulic pump control means 17 for variably controlling the input of the hydraulic pump 2. The hydraulic pump 2 is a variable discharge type hydraulic pump and has a constant output characteristic in relation to the discharge pressure and flow rate. Further, the controller 16 is connected to an engine control means 18, for example, an all speed type electronic governor and the like for controlling the number of revolutions or output of the engine 1. The output number of revolutions of the engine 1 is detected by the means 19 for detecting the number of revolutions of engine and notified to the controller 16 via the means 19 for detecting the number of revolutions of engine. In addition, the controller 16 is connected to the second control device 20 to control its action. This controller 16 consists of a microcomputer and the like and performs the control of engine starting, each hydraulic actuator and the like, depending on the excavator manipulating mechanism 14. The second control device 20 is connected to the electric motor 4 and the battery 6, respectively. The device 20 detects the voltage of the battery 6 and notifies it to the controller 16. In addition, the third control device 21 is connected to said battery 6 and is also connected to the generator 22 concurrently serving as a rotating electric motor for the upper rotating body.

The control actions of the controller 16 at the time of operating will be explained.

STEP 1: During the operation of a working machine, the voltage of the battery 6 is notified to the controller 16 via the second control device 20.

STEP 2: Judgment as to whether the charge of electricity of battery is required or not is performed.

STEP 3: If the charge of electricity of battery is required in STEP 2, the engine 1 is controlled via the engine control means 18 and to the set number of revolutions (for example, 2000 rpm) which is set by the means 15 for setting the number of revolutions of engine, the electric motor 4 is switched to the generator action via the second control device 20, and the electric power generated by the electric motor 4 is charged to the battery 6.

STEP 4: If the charge of electricity of battery is not required in STEP 2, judgment as to whether the input of the hydraulic pump 2 is smaller than the output of the engine 1 or not is performed.

STEP 5: If the input of the hydraulic pump 2 is smaller than the output of the engine 1 in STEP 4, the number of revolutions of engine 1 is controlled and turned to between the set number of revolutions and the number of high idle revolutions via the engine control means 18 without performing the charge of electricity of the battery 6 via the second control device 20.

STEP 6: If the input of the hydraulic pump 2 is larger than the output of the engine 1 in STEP 4, the input of the hydraulic pump 2 is reduced via the hydraulic pump control means 17, the electric motor 4 is switched to the electric motor action via the second control device 20, so that the electric motor output of the electric motor 4 supplements the torque of the engine 1 via the accelerating mechanism 3, and the number of revolutions of the engine 1 turns to the set number of revolutions via the engine control means 18.

With such a drive apparatus, it is possible to obtain functional effects as follows. An engine having a capacity smaller than the maximum output of the hydraulic pump 2 can be used, whereby efficient utilization of engine output can be attained and the energy will be saved. Moreover, even if the horsepower absorbed by the hydraulic pump 2 is increased over the output of the engine 1, it is possible to maintain the number of revolutions the engine in the set number of revolutions of engine because the number of revolutions of engine is stable without being reduced so high as in the prior art, whereby variation of the number of revolutions of engine will not affect the control of hydraulic actuator and utilization convenience of working machine will not be deteriorated. In addition, because the battery 6 can be charged with electricity by operating the generator 22 concurrently serving as a rotating electric motor in the generator action at the time of braking the rotating body to perform regenerative braking, it is possible to reuse energy besides in rotation driving, as compared to the hydraulic regeneration of prior art. In addition, by constructing the rotation driving system independent from the hydraulic circuit, functional effects are obtained that there will be no interference when a working is performed by combined actions of the rotation driving system, whereby controllability can be enhanced. Furthermore, in the first and second embodiment as explained in the above, the output of the engine 1 is connected to the electric motor 4 via the accelerating mechanism 3 and it is possible to use the electric motor concurrently serving as a generator in the high range of the number of revolutions as compared to the number of revolutions of engine, whereby it is possible to obtain a functional effect that the electric motor concurrently serving as a generator can be made compact and the space can be saved. Also, in the above description of embodiments, the description that the number of revolutions of engine is operated in the set number of revolutions of engine also includes the case that the engine is operated near the set number of revolutions, and it is needless to say that identical functional effects can also be obtained in this case.

Third Embodiment (FIGS. 6 to 10)

Figure 6:
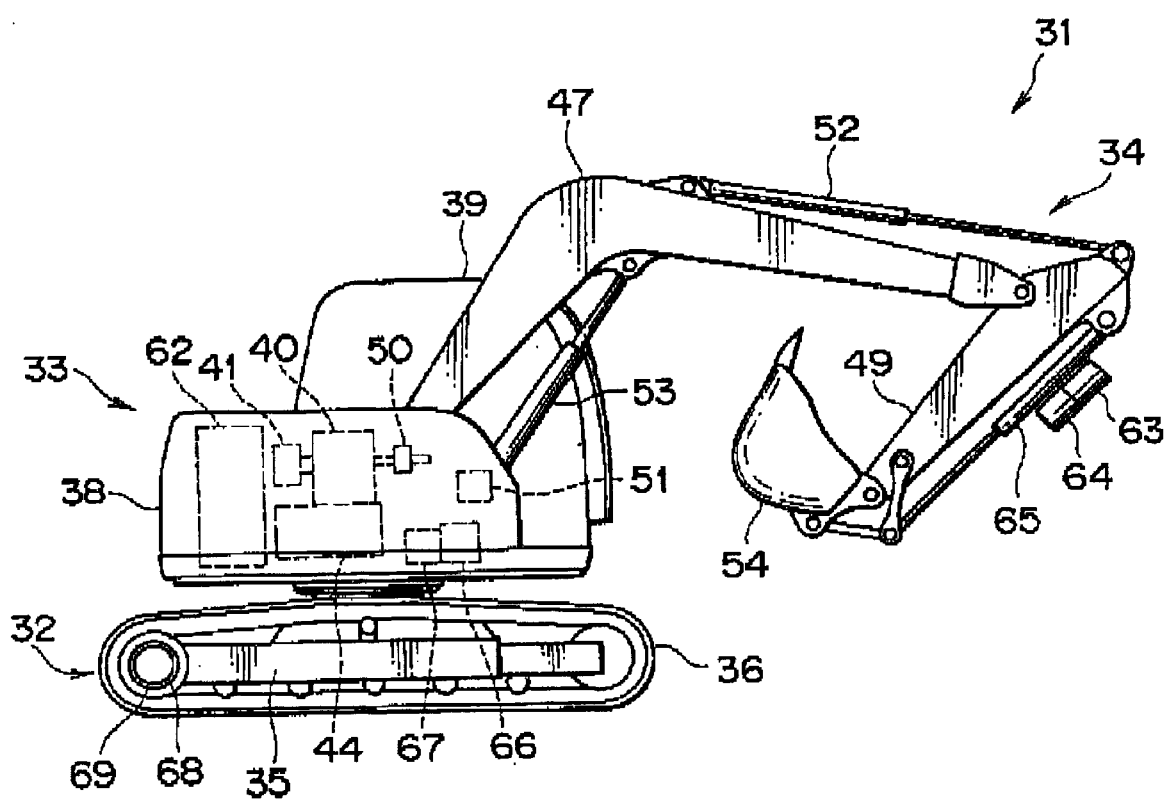
FIG. 6 is a schematic view showing the outlined construction of a excavator related to the third embodiment of the present invention.

FIG. 6 is a schematic view showing the outlined construction of an excavator related to the third embodiment of the present invention. In FIG. 6, the excavator 31 consists of a lower traveling body 32, an upper rotating body 33, and an excavating attachment 34.

The lower traveling body 32 comprises left and low clawer frames 35 and crawlers 36 (only one side of each of them is shown), and left and low traveling electric motors 68, and travel decelerators 69 (only one side of each of them is shown). The travel decelerators 69 decelerate and transfer the revolutions of the electric motors 68 to a travel mechanism.

The upper rotating body 33 consists of a rotating frame 38, a cabin 89 and etc. The rotating frame 38 is provided with an engine 40 as a power source, a generator 41 and a hydraulic pump 50 which are driven by the engine 40, a hydraulic oil tank 44, a control valve 51, a rotating electric motor 66 for rotating the upper rotating body 33, and a rotating decelerator 67 that decelerates and transfers the revolutions of the rotating electric motor 66 to the rotation mechanism (rotating gears). Besides, a control section (not shown) including an inverter 61 (refer to FIG. 7) and the like is provided within the upper rotating body 33.

The excavating attachment 34 comprises a boom 47, a boom cylinder 53 that expands and contracts to move the boom 47 up and down, an arm 49, an arm cylinder 52 for rotating the arm 49, a bucket 54, and a bucket cylinder 65 for rotating the bucket 54. And, an electric motor 63 for bucket and a hydraulic pump 64 for bucket (herein below, to be referred as "bucket pump") driven by the electric motor 63 for bucket are mounted in the bucket cylinder 55. The electric motor 63 for bucket, the bucket pump 64 and the bucket cylinder 65 are used in an integrated type as explained hereinafter.

Figure 7:
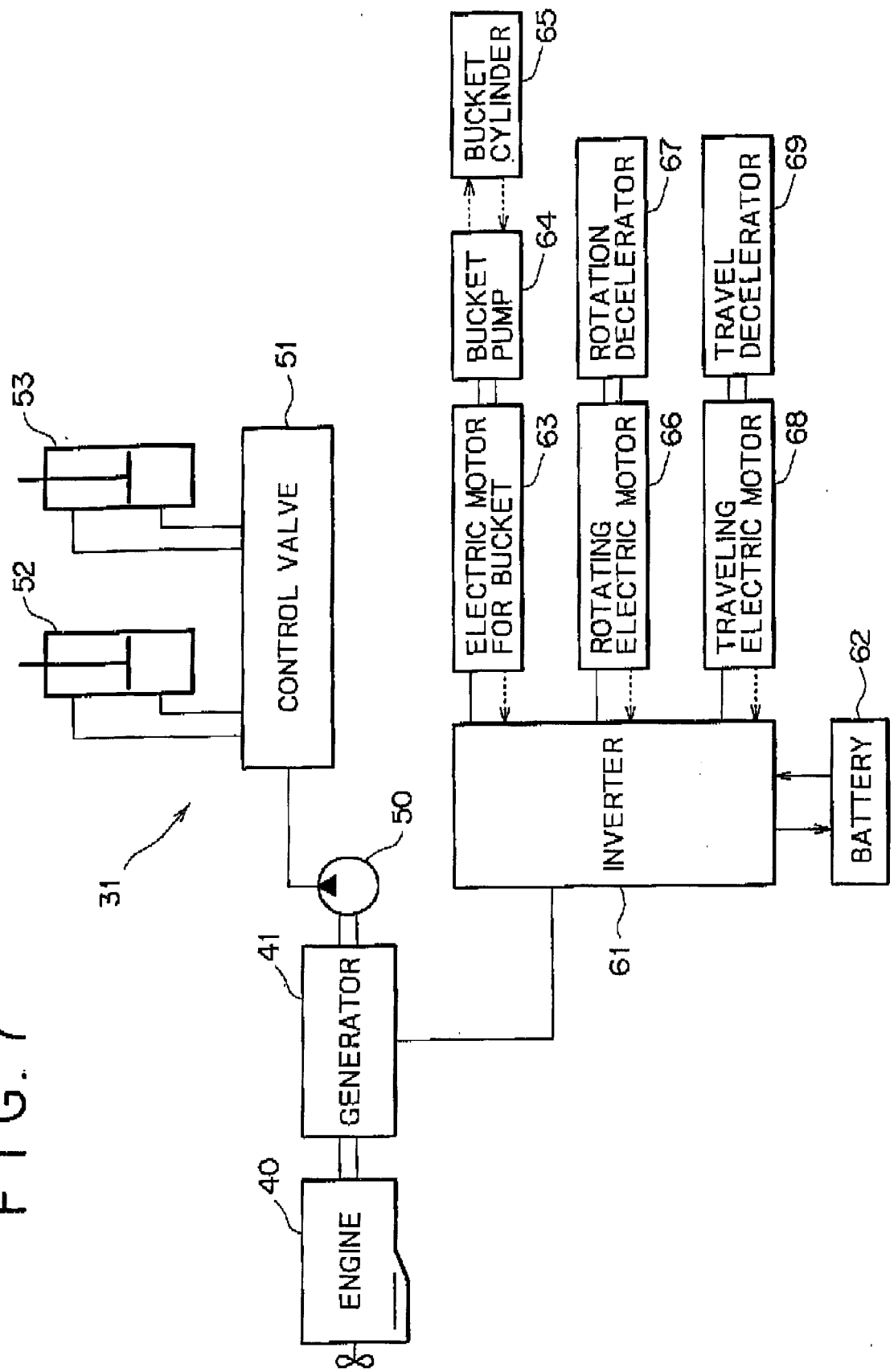
FIG. 7 is a block diagram schematically showing the driving system of the excavator shown in FIG. 6.

Next, a driving system for the excavator 31 will be explained based on FIG. 7. FIG. 7 is a block diagram schematically showing the driving system for the excavator 31. As shown in FIG. 7, the generator 41 and the pump 50 are mounted on the output shaft of the engine 40 in unison. And, the hydraulic oil from the hydraulic pump 50 is supplied to each of the arm cylinder 52 and the boom cylinder 53 via the control valve 51. According to this, the arm 49 and the boom 47 can be moved to a position in an optional velocity, by actuating the manipulation lever to control the control valve 51.

In the manner, in the excavator 31 of this embodiment, the arm 49 and the boom 47, which require excellent maneuverability for smoothly following the operator's manipulation of lever, are driven by the hydraulic oil from the hydraulic pump 50 without intervention of an electric motor and the like. Therefore, the operator can precisely manipulate delicate movements of the arm 49 and the boom 47.

In addition, the generator 41 generates, as a power generating means, AC electric power from the output torque of engine 40 and supplies it to the inverter 61 when the hydraulic pump 50 side is low loaded, while it converts, as an electric motor, the electric energy from the battery 62 into torque to drive the pump 50 when the pump 50 is high loaded. Switching between a low loaded operation and a high loaded operation may be performed based on the product of pressure and flow rate of hydraulic oil measured in the rear stage of the pump 50 or by manually controlling a control section which is not shown.

An inverter 61 is connected to the generator 41. The inverter 61 performs either a normal electricity charging function for converting AC electric power generated by the generator 41 into DC electric power and accumulating it in the battery 62, or a regenerative electricity charging function of charging electricity for converting AC electric power generated by the regenerative function of electric motors 63, 66, 68 connected to the inverter 61 and accumulating it in the battery 62.

Also, the inverter 61 performs either a electricity discharging function for converting electric energy accumulated in the battery 62 into AC and supplying it to the motors 63, 66, 68 and/or the generator 41, or a supplying function for supplying the AC electric power from the electric generator to the motors 63, 66, 68. When performing these two functions, the inverter 61 can change the frequency of AC current to an optional value according to a command from the control section, whereby the number of revolutions of the motors 63, 66, 68 can be controlled.

Three motors 63, 66, 68 are connected to the inverter 61. As explained in the above, the electric motor 63 for bucket is constructed as an actuator integrated with the bucket pump 64 and the bucket cylinder 65. The rotating electric motor 66 and the traveling electric motor 68 are connected to the rotating decelerator 67 and the travel decelerator 69, respectively. These three motors 63, 66, 68 are controlled in respective ON/OFF, rotating velocities and rotating directions by the manipulation of the operator.

In this way, the excavator 31 of the embodiment is constructed so that the bucket 54, the rotating mechanism and the travel mechanism, which do not require excellent maneuverability for smoothly following the operator's manipulation of lever so much, are driven via electric motors 63, 66, 68. Therefore, it is possible to efficiently use the electric energy of the battery charged using a surplus torque of the engine 40, whereby the excavator 31 can be actuated in a high-energy efficiency.

Next, the operation of the excavator 31 will be explained. When the hydraulic pump 50 side is low loaded, if the engine 40 is operated, the generator 41 performs generation of electric power, and AC electric power generated thereby is supplied to the motors 63, 66, 68 via the inverter 61, whereby the electric motors can be driven. And, the hydraulic pump 50 is driven by the engine 40, the arm cylinder 62 and the boom cylinder 53 can be suitably moved by manipulating the control valve 51.

The electric motors 63, 66, 68 are operated by the AC electric power supplied thereto from the generator 41 via the inverter 61, when the sum of loads applied to them is low. In this situation, the AC electric power generated by the generator 41 is converted into DC electric power in the inverter 61 and accumulated in the battery 62. Furthermore, if the arm cylinder 52 and the boom cylinder 53 are not used, the electric power accumulated in the battery is sufficient, and the sum of loads applied to the motors 63, 66, 68 is low, as at the time of travel of the excavator 31, it is possible to reduce the output of the engine 40 or to stop the engine 40, so that the electric power can be supplied to the motors 63, 66, 68 only from the battery 62. According to this, it is possible to prevent the engine 40 from being uselessly operated, whereby noise and exhaust gas can be reduced and the fuel consumption rate can be decreased.

On the one hand, if the total loads of the motors 63, 66, 68 become higher than a predetermined value, the charging of AC electric power generated in the generator 41 to the battery 62 is stopped, and not only the electric power supplied from the generator 41 but also the electric power stored in the battery 62 is jointly used, if needed.

In this manner, the action of the inverter 61 is switched according to whether the total loads of electric motors 63, 66, 68 are larger than a predetermined value or not, and the switching is performed based on the product of electric current flowing through the motors 63, 66, 68 and voltage thereof or by manually controlling the control section.

Also, during the operation, the motors 63, 66, 68 can act as a generator using potential energy and kinetic energy thereof (regenerative action) and the regenerative electric power generated thereby can be stored in the battery 62. In particular, the rotating electric motor 66 can store large kinetic energy at the time of rotating accelerating, whereby regenerative effect of energy is high at the time of decelerating.

Next, when the hydraulic pump 50 side is high loaded, the generator 41 acts as an electric motor to convert the electric energy received from the inverter 61 via the battery 62 into torque and to drive the hydraulic pump. As a result, the hydraulic pump 50 is also driven by means of the torque from the generator 41, besides being driven by the output torque of the engine. According to this, even if the output of the engine 40 is relatively small, the hydraulic pump 50 can also cope with relatively large load.

In this situation, because electric power is not supplied from the generator 41 to the inverter 61, the motors 63, 66, 68 will be driven by the electric power supplied from the battery 62.

Figure 8:
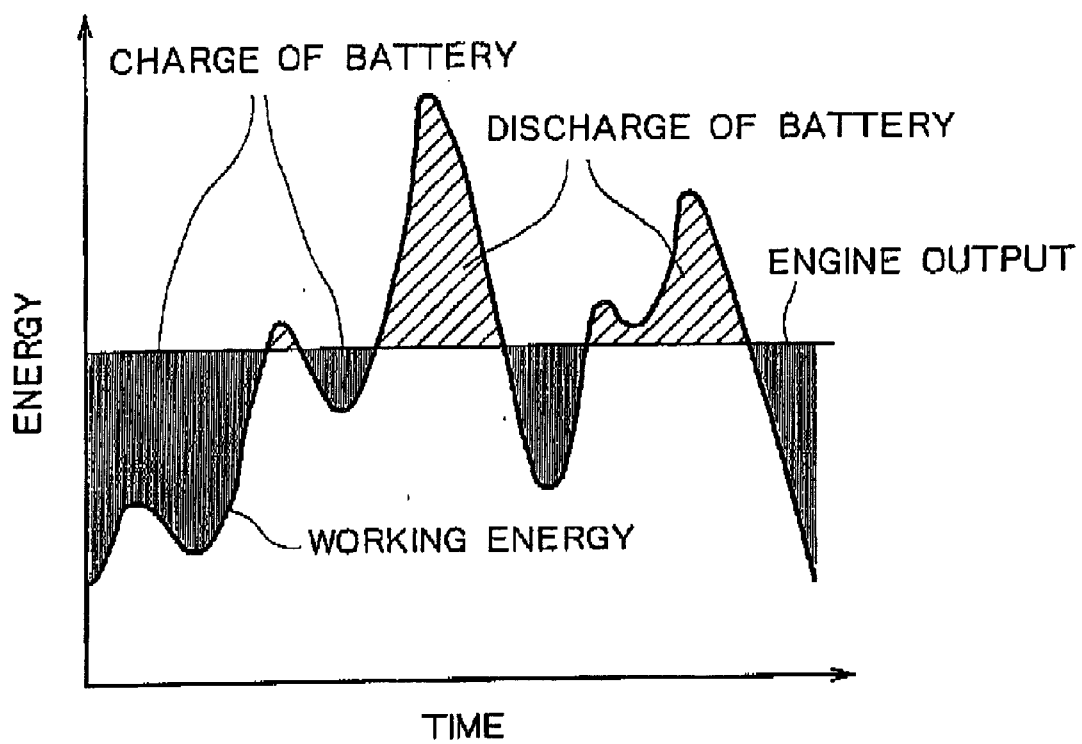
FIG. 8 is a graph showing the relationship between the engine output and the working energy in the excavator shown in FIG. 6.

That is, in the excavator 31 of this embodiment, the output energy of the engine is constant as shown in FIG. 8, whereby the battery 62 is charged with electricity when the sum of loads of the hydraulic pump 50 and the motors 63, 66, 68 (working energy) is smaller than the constant value, and is discharged to be used as driving energy for the pump 50 and/or the motors 63, 66, 68 when the working energy is larger than the constant value.

Like this, according to the excavator 31 of this embodiment, the pump 51 driven by the engine 40 is connected to the arm cylinder 52 and the boom cylinder 53, which are hydraulic actuators, via controller 51, whereby it is possible to realize good maneuverability for the arm 49 and the boom 47 which require to be smoothly moved following the movements of the manipulation lever. And, the motors 63, 66, 68 which receive the supply of electric energy from the generator 41 and/or the battery 62 will serve as driving sources for the bucket, the rotating mechanism and the travel mechanism, whereby it is possible to increase energy efficiency higher than the prior art. As a result, with the excavator 31 of this embodiment, the hydraulic pump 50 drives the arm 49 and the boom 47 which require good maneuverability, and the motors 63, 66, 68 serve as driving sources for the bucket 54, the rotating mechanism and the travel mechanism which do not require good maneuverability so much, whereby it is possible to realize relatively high energy efficiency while assuring the good maneuverability of the arm 49 and the boom 47.

Furthermore, the hydraulic pump 50 does not drive all of the moving parts as in the prior art, and the bucket 54, the rotating mechanism and the travel mechanism may be driven by the motors 63, 66, 68, whereby it is possible to construct each of the motors 63, 66, 68 to be relatively compact, and to separately mount them in separated places. In this embodiment, the pump 50 is located within the upper rotating body 33 which is the main shell of the excavator 31 while the motor 63 for bucket is located near the arm and the motor 68 is located in the lower traveling body 32, whereby the excavator 31 can be constructed to be relatively compact and does not require a large space within the upper rotating body 33.

In addition, in this embodiment, the bucket cylinder 65 is driven, not directly by the motor 63 but via the bucket pump 64. For this reason, it is possible to move the bucket 54 performing linear motion with a thrust relatively larger than that obtained from converting rotation motion into linear motion using the rack and pinion mechanism and the like. Also, it hast a simple structure than that in using the rack and pinion as a means for linearly moving the bucket 54.

Figure 9:
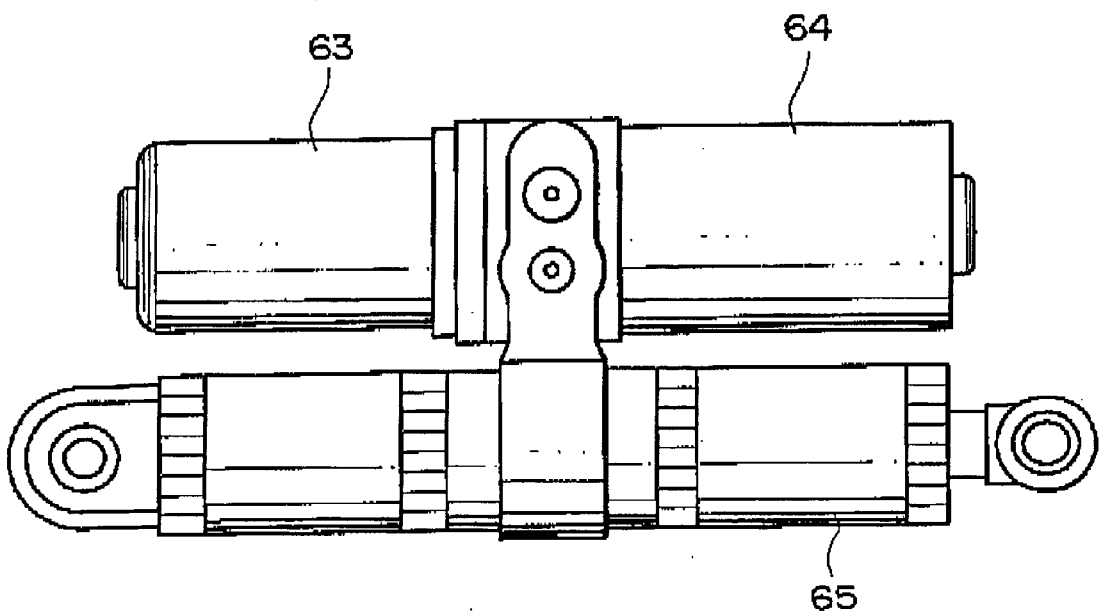
FIG. 9 is a side view of an actuator integrated with an electric motor, a bucket pump and a bucket cylinder, which are used in excavator shown in FIG. 6.

Next, the aforementioned integrated actuator of the motor 63, the bucket pump 64 and the bucket cylinder 65 will be explained with reference to FIG. 9 and FIG. 10. FIG. 9 is a side view of the integrated actuator and FIG. 10 is its circuit diagram.

As shown in these drawings, the bucket pump 64 is constructed in a bi-directional pump wherein the discharge direction of oil is changed in response to the rotating direction of the motor 63, and the discharge ports in both sides of the pump 64 are connected to oil chambers in the head and rod sides of bucket cylinder 65 via ducts 71, 72.

Figure 10:
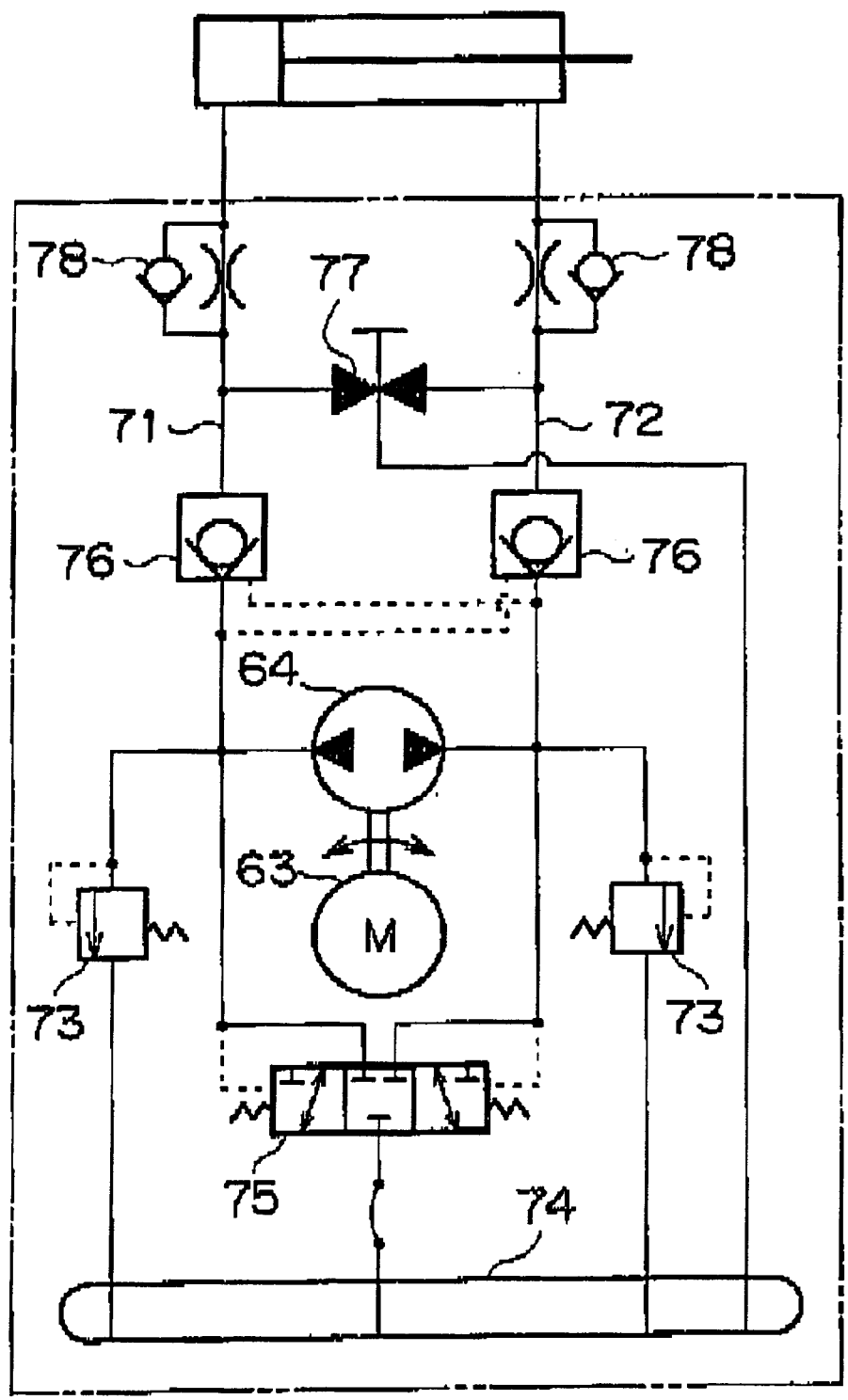
FIG. 10 is a circuit diagram of the actuator integrated with the electric motor, the bucket pump and the bucket cylinder, as shown in FIG. 9.

In FIG. 10, 73 is a relief valve, 74 is a oil tank, 75 is an automatic switching valve located between the pump 65 and the oil tank 75, 76 is a operating check valve, 77 is a manual on-off valve located between both side ducts 71, 72, and 78 is a slow return valve.

If such an integrated actuator is used, it is possible to reduce size and weight of the entire unit as compared to the case that the motor 63 and the hydraulic pump 64 are separately mounted. For this reason, they can be more advantageously installed in the excavating attachment 34. Furthermore, if the bucket cylinder 65 is kept stopped, it is possible to stop the motor 63 and hydraulic pump 64 so that a surplus of hydraulic oil will not be wasted. Accordingly, the energy efficiency can be more highly enhanced. And, because it is not required to lay a piping for connecting the pump 64 and the bucket cylinder 65, the construction can be simplified and the likelihood of oil leakage can be reduced.

Figure 11:
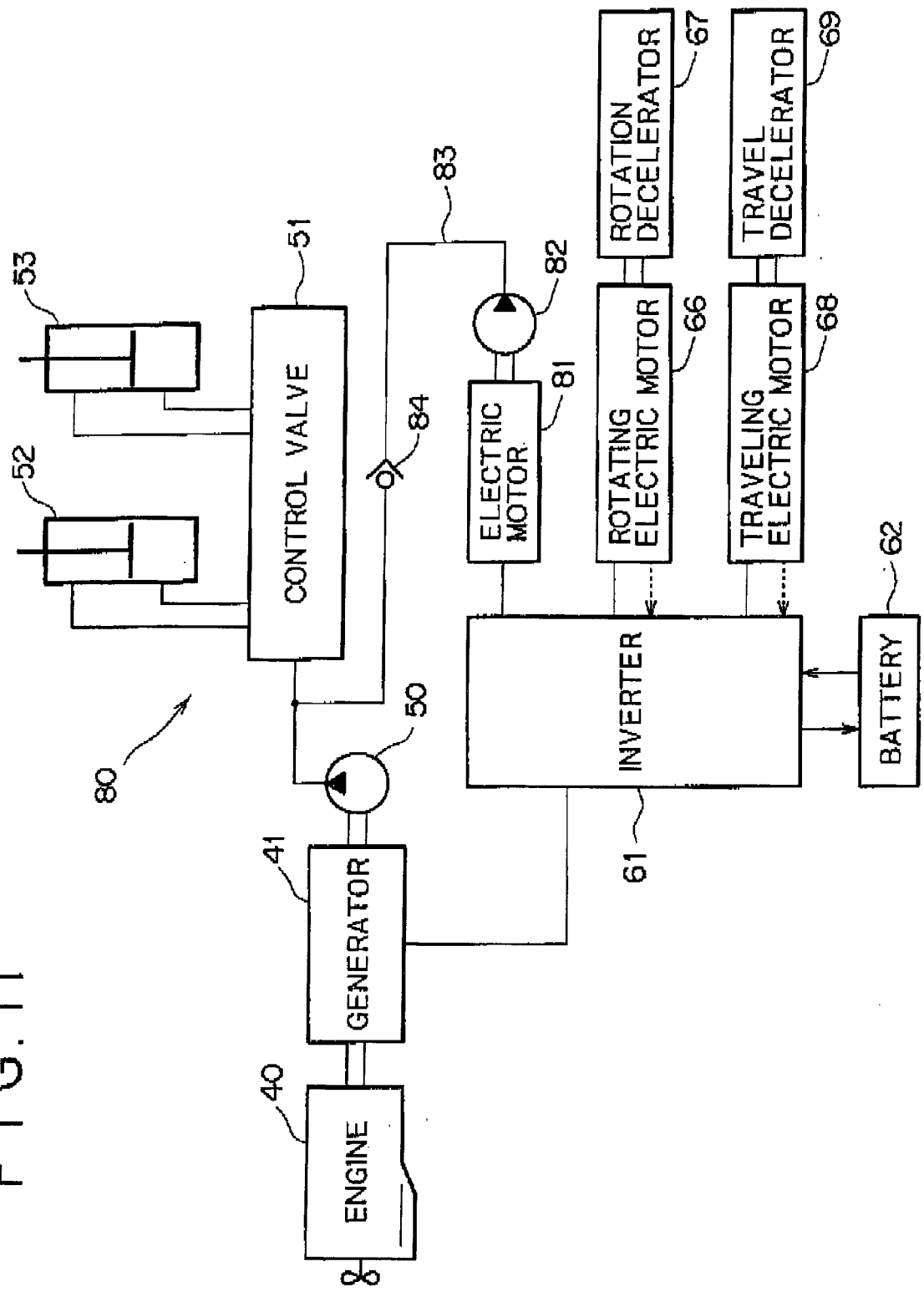
FIG. 11 is a schematic view showing the outlined construction of an excavator related to the fourth embodiment of the present invention.
Figure 12:
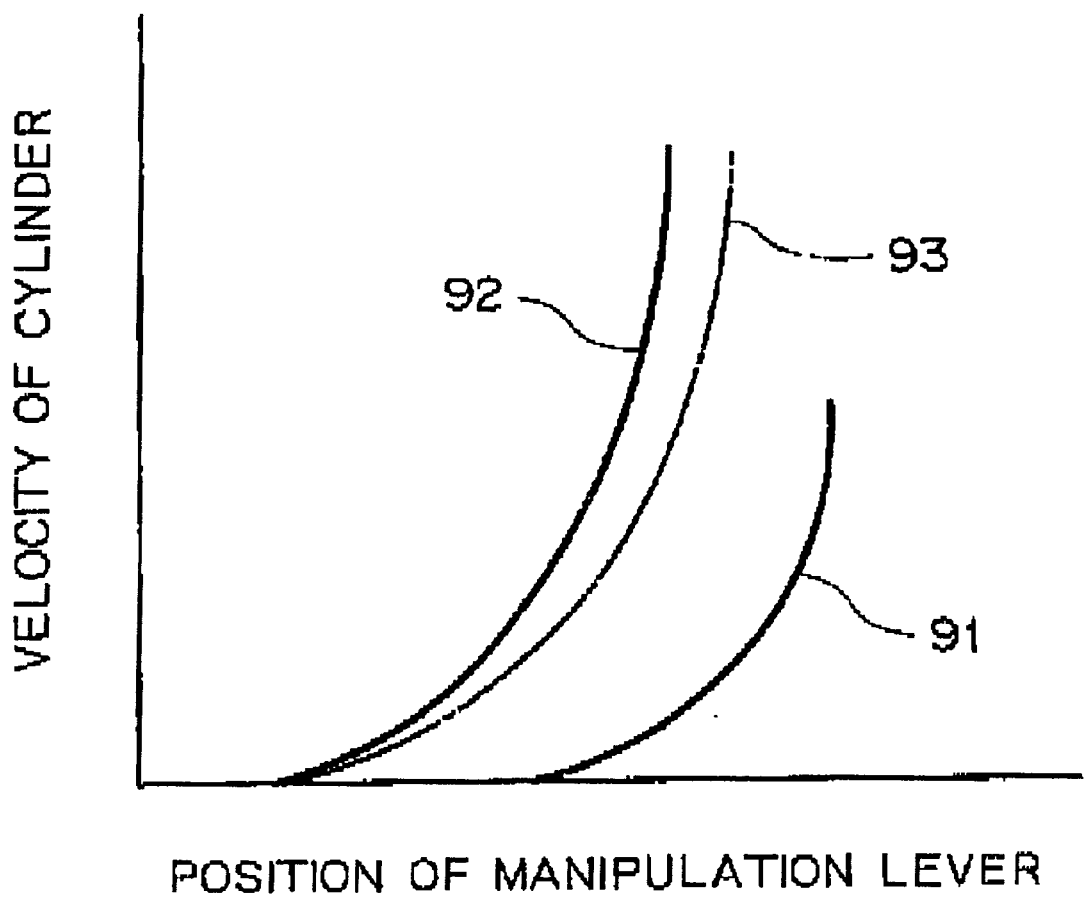
FIG. 12 is a graph showing the relationship between the position of manipulation lever and the velocity of cylinder in the excavator of the third and fourth embodiments of the present invention.
Figure 13:
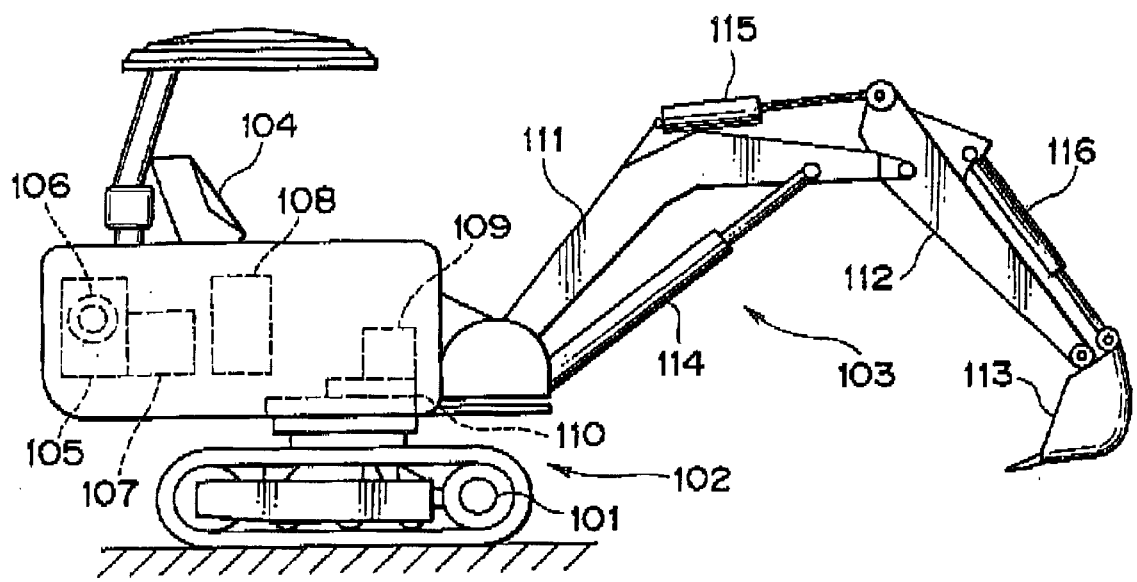
FIG. 13 is a view showing the general construction of a self-traveled excavator.
Figure 14:
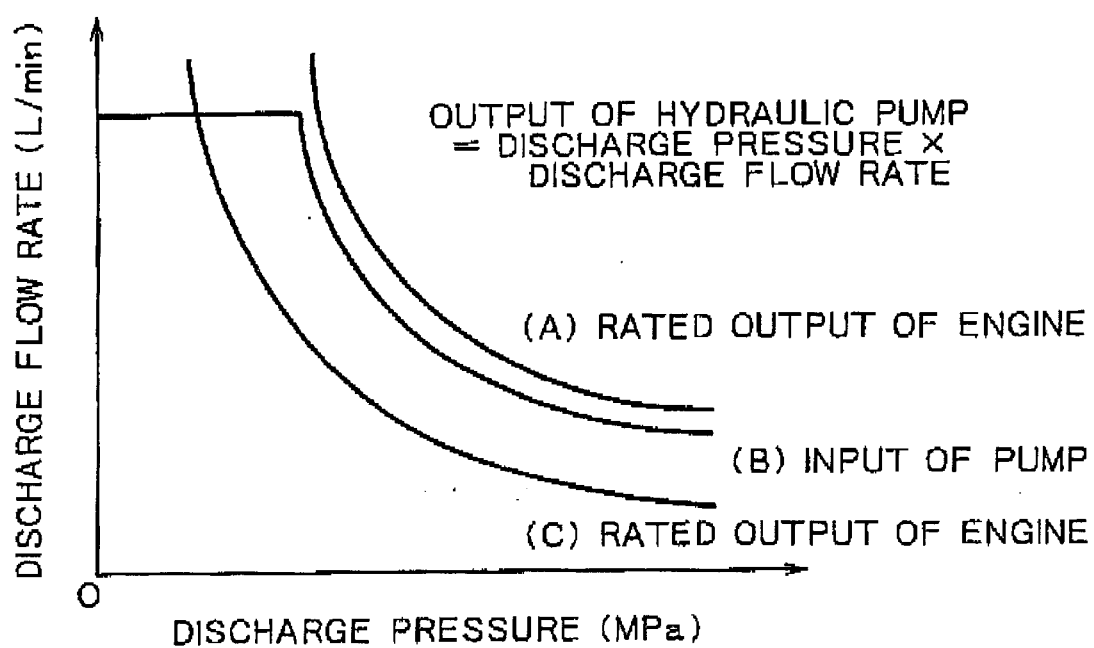
FIG. 14 is a graph showing the relationship between the discharge pressure and discharge flow rate of the hydraulic pump.

Fourth Embodiment (FIGS. 11 and 12)

Next, the excavator according to the fourth embodiment of the present invention will be explained with reference to FIG. 11. FIG. 11 is a schematic view showing the outlined construction of the excavator according to the fourth embodiment of the present invention. In FIG. 11, the components identical to those of FIG. 7 are indicated with same reference numerals used in FIG. 7 and descriptions thereof will be omitted. The excavator 80 of this embodiment is bascially same with that of the third embodiment in construction, except that the inverter 61 and the valve 51 are connected with each other by means of a junction hydraulic circuit 83. In order to simplify the illustration, the motor 63 for bucket, the bucket pump 64 and the bucket cylinder 65 are not shown in FIG. 11.

In this embodiment, the junction hydraulic circuit 83 is provided with an electric motor 81, a hydraulic pump 82 and a check valve 84, and hydraulic oil from the hydraulic pump 82 is supplied between the hydraulic pump 50 and the control valve 51 in response to the load of the pump 50. In this situation, as explained in the third embodiment, the load of the pump 50 side is measured by controlling a control section, which is not shown, based on the product of the hydraulic pressure and flow rate measured in the rear stage of the pump 50, and it may be desired if a signal is provided to the electric motor 81 so that hydraulic oil corresponding to the load will be supplied between the pump 50 and the control valve 51.

In this manner, the hydraulic oil, the quantity of which is corresponding to the load of the pump 50 is supplied between the pump 50 and the valve 51 from the hydraulic pump 82, whereby the operator can always constantly maintain the operation starting position of the manipulation lever for actuating the arm cylinder 52 or the boom cylinder 53.

This point will be explained with reference to FIG. 12. FIG. 12 is a graph showing the relationship between the position of the manipulation lever and the velocity of the cylinder. In FIG. 12, the curve 91 shows the case that the load of the boom cylinder 53 is relatively large in the third embodiment, the curve 92 show the case that the load of the boom cylinder is relatively small in the third embodiment, and the curve 93 shows the relationship between the position of the manipulation lever and the velocity of the cylinder in the third embodiment.

As apparent from FIG. 12, in the third embodiment, the position of the manipulation lever corresponding to the start of operation of the boom cylinder 53 is varied depending on the magnitude of the load applied to the boom cylinder 53, and if the manipulation lever is not extensively moved, the boom cylinder 53 will not start to move.

Contrary to this, because a quantity of hydraulic oil corresponding to the load of the pump 50 is supplied between the pump 50 and the control valve 51 from hydraulic pump 82 in this embodiment, the hydraulic pressure in this part can be fixedly maintained, whereby the operator can normally maintain the operation starting position of the manipulation lever for operating the boom cylinder 53 constantly. Accordingly, the operator can always operate the manipulation lever with a same feeling regardless of the magnitude of the load applied to the boom cylinder 53. Furthermore, while it may be considered to compensate the variation of the load of the pump 50 side as a torque assist to the pump 50 by using the generator 41 as an electric motor, according to this embodiment, it is possible to reliably maintain the operation starting position of the manipulation lever to be constant with a loss less than that means by directly supplying the hydraulic oil to the sides of the hydraulic cylinders 52, 53.

Furthermore, although an AC generator is used as the generator in the third and fourth embodiment as explained in the above, a DC generator may be also used. In that case, the generator and the battery can be directly connected without intervention of an inverter. Also, it is not necessary to construct the electric motor 63 for bucket, the bucket pump 64 and the bucket cylinder 65 in an integrated form, and they may be separately constructed. And, since a secondary battery such as a lithium ion battery and the like is typically used as the battery 62, it is possible to use a capacitor or to use the battery and the capacitor in combination.

In addition, the present invention can be also applied to a excavator fitted with an other working tool (for example, a hiller or a crusher) instead of the bucket, an excavator provided with a loading type for excavating toward a side remote from the adjacent side instead a back hoe type for excavating toward the adjacent side as shown in FIG. 6 as the excavating attachment, and a excavator using wheels instead of crawlers as the lower traveling body. Furthermore, the present invention can be broadly applied as a drive apparatus for a working machine including construction equipment such as a wheel loader and the like, and a hydraulic working machine such as a forklift and the like.

Industrial Applicability

As explained in the above, the present invention can be broadly applied as a drive apparatus for a hydraulically driven machine including a hydraulic working machine, for example a construction equipment such as a hydraulic excavator and a wheel loader, a hydraulic working machine such as a fork lift and the like, in order to improve energy efficiency and maneuverability thereof.

What is claimed is:

1. A drive apparatus of working machine comprising:

an engine;

a hydraulic pump connected to said engine and having a maximum input larger than an output of said engine;

an electric motor concurrently serving as a generator which is connected to the output shaft of said engine and performs a generator action or an electric motor action;

a battery for accumulating electric power generated by said electric motor concurrently serving as a generator;

a first control device connected to said electric motor and said battery to switch the actions of said electric motor, the first control device charging said battery with electric power generated by rotation of said electric motor at the time of the generator action, and supplying electric power accumulated in said battery to said electric motor to rotate it at the time of the electric motor action; and a controller connected to said first control device, wherein when an input of said hydraulic pump is smaller than said output of the engine, said controller operates said engine between the set number of revolutions and the number of high idle revolutions of the engine and when the input of said hydraulic pump is larger than the output of said engine, said controller comprising means for reducing the input of said pump and operating said electric motor in the electric motor action using the electric power accumulated in said battery to supplement the output of said engine, so that said engine will be operated near the set number of revolutions.

2. A drive apparatus of working machine comprising:

an engine;

a hydraulic pump connected to said engine and having a maximum input larger than an output of said engine;

an electric motor concurrently serving as a generator which is connected to an output shaft of said engine and performs a generator action or an electric motor action;

a battery for accumulating electric power generated by said electric motor concurrently serving as a generator;

a second control device connected to said electric motor and said battery to switch the actions of said electric motor, the second control device charging said battery with electric power generated by rotation of said electric motor, at the time of the generator action, and supplying electric power accumulated in said battery to said electric motor to rotate it, at the time of the electric motor action;

a generator concurrently serving as a rotating electric motor that rotates a rotating body of the working machine and performs an electric motor action or a generator action; and a third control device connected to said generator currently serving as a rotating electric motor and said battery to switch the actions of said generator concurrently serving as a rotating electric motor, the third control device including means for operating said generator concurrently serving as a rotating electric motor in the electric motor action to drive said generator concurrently serving as a rotating electric motor using the electric power accumulated in said battery, at the time of rotating the rotating body, and operating said generator concurrently serving as a rotating electric motor in the generator action to charge said battery with the electric power generated by said generator concurrently serving as a rotating electric motor, at the time of braking the rotating body.

3. The drive apparatus of working machine according to claim 2, further comprising:

a controller connected to said second control device and said third control device, wherein when an input of said hydraulic pump is smaller than the output of said engine, said controller operates said engine between the set number of revolutions and the number of high idle revolutions, and when the input of said hydraulic pump is larger than the output of said engine, the controller reduces the input of said hydraulic pump and operates said electric motor concurrently serving as a generator in the electric motor action using the electric power accumulated in said battery to supplement the output of said engine, thereby operating said engine near the set number of revolutions.

4. The drive apparatus of working machine according to any one of claims 1 to 3, wherein said engine and said electric motor serving as a generator are connected via an accelerating apparatus.

5. A drive apparatus of working machine comprising:

an engine;

a first hydraulic pump driven by said engine;

a first hydraulic actuator connected to said first hydraulic primp via a control valve, an electricity storage means for accumulating electric energy;

an energy conversion means for selectively performing a function that converts mechanical energy received from said engine into electric energy to supply to said electricity storage means and a function that converts electric energy received from said electricity storage means into mechanical energy to supply to said first hydraulic pump; and a first electric motor that receives a supply of electric energy from at least one of said energy conversion means and said electricity storage means and serves as a driving source of moving parts other than said first hydraulic actuator.

6. The drive apparatus of working machine according to claim 5, wherein electric energy generated by regenerative control of said first electric motor is accumulated in said electricity storage means.

7. The drive apparatus of working machine according to claim 5, further comprising:

a second hydraulic pump driven by said first electric motor; and a second hydraulic actuator driven by said second hydraulic pump.

8. The drive apparatus of working machine according to claim 7, wherein said first electric motor, said second hydraulic pump and said second hydraulic actuator are integrated as one unit.

9. The drive apparatus of working machine according to claim 5, further comprises:

a second electric motor that receives electric energy from at least one of said energy conversion means and said electricity storage means, and a third hydraulic pump driven by said second electric motor, pressure oil from said third hydraulic pump being supplied between said first hydraulic pump and said control valve.

* * * * *